Patented Feb. 18, 1930

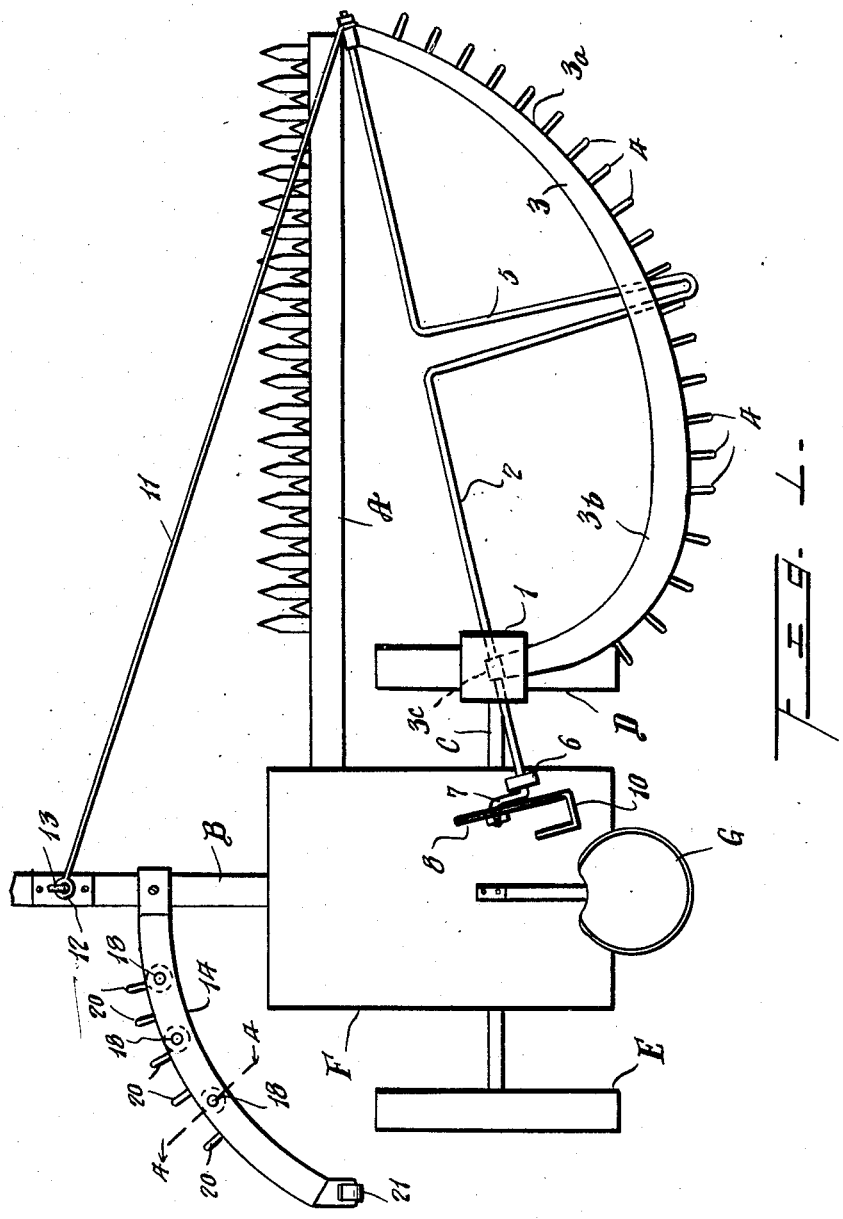

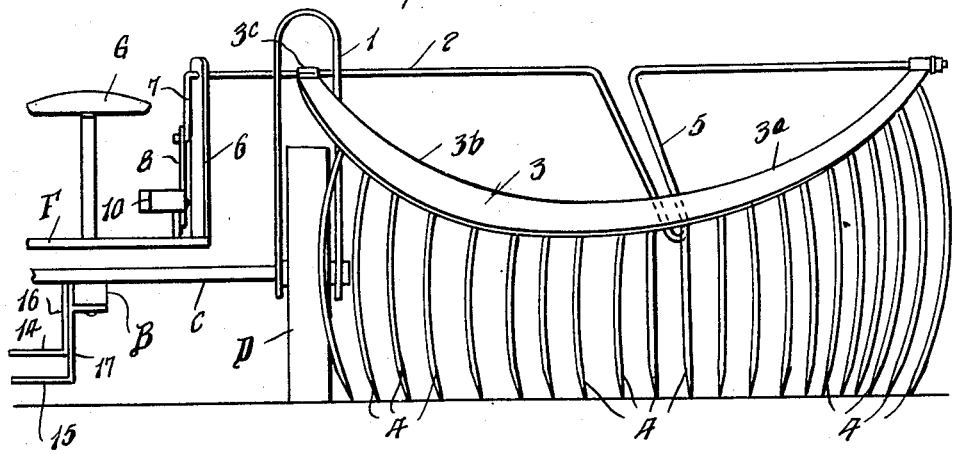
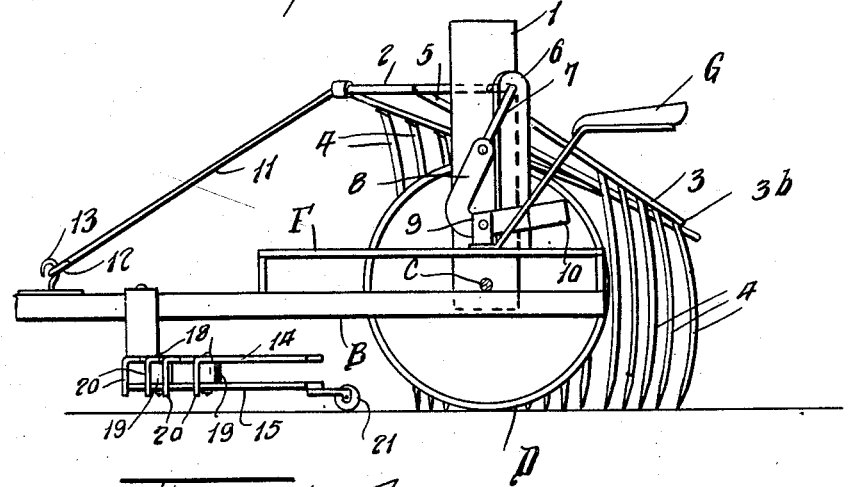
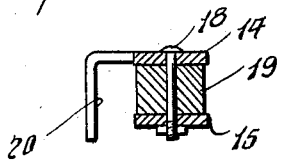

1,748,020

UNITED STATES PATENT OFFICE

HENRY B. HALE, OF DUNLAP, KANSAS

SHOCKER ATTACHMENT FOR MOWING MACHINES

Application filed October 25, 1928. Serial No. 315,079.

The invention relates to an attachment for mowing machines to rake the cut hay immediately behind the cutter bar and to form it into shocks or cocks at the rear of the machine, and has for its object the provision of a device that is adapted to be attached to a mowing machine and provided with a dumping rake under the control of the operator of the machine so that as the grass is cut it will be raked and formed into shocks, the rake being dumped from time to time to leave the shocks on the field, and thus provide for performing the two operations of cutting and raking simultaneously.

A further object of the invention is the provision of a shock deflector adapted to be secured to the tongue of a mowing machine and forming a guard for the wheel of the machine farthest removed from the cutting side of the machine to engage shocks standing in the field and previously formed by the attachment secured to the machine to move the standing shocks to one side out of the way of the guarded wheel.

The invention will be described in detail hereinafter and will be found illustrated in the accompanying drawings, in which Figure 1 is a top plan view of a conventional mowing machine showing the shocker attachment and shock deflector applied thereto, Figure 2 is a fragmentary rear view, Figure 3 is a side view in elevation, and Figure 4 is a sectional detail on a plane indicated by the line 4—4 of Figure 1.

In the drawings similar reference characters are used to designate corresponding parts throughout the several views.

In Figures 1, 2, and 3, a conventional mowing machine is shown diagrammatically to which the shocker attachment and shock deflector are secured, the mowing machine being provided with a cutter bar A, a draft tongue B, an axle C on which are mounted the traction wheels D and E, and a platform F supporting the driver's seat G. The shocker attachment includes an inverted U-shaped supporting member 1 that is mounted on the shaft C and straddles the traction wheel D, said member 1 supporting a shaft 2 that is journaled therein and on which is pivotally supported a rake frame 3 having the rake teeth 4, said shaft 2 being provided with an arm 5 that engages under the rake frame 3. The arm 5 may be formed as shown in the drawings by shaping the shaft 2 in a V-shaped bend, or may be formed in any other suitable manner. Shaft 2 is also journaled in an upright support 6 mounted on the platform F, and has a crank arm 7 on which is pivotally secured one arm of a bell crank lever 8 that is fulcrumed on a supporting member 9 secured to the platform F, the other arm of said lever having a rebent portion 10 providing a stirrup for actuation of the lever 8 by the foot of the operator of the machine seated on the seat G, 11 indicates a brace bar pivotally engaging the outer end of the shaft 2, and having an eye 12 that engages a hook 13 on the draft tongue B.

The rake head or bar 3 is curved rearwardly as shown, and has the outer end thereof designated 3ª curved gradually rearwardly on radii longer than the part 3ᵇ that is rearwardly curved from the end 3ᶜ mounted on the shaft 2 between the arms of the U-shaped member 1. By this construction it will be apparent that the material that is cut by the cutter bar A will be directed by the teeth 4 carried by the part 3ª of the rake head 3 toward the wheel D of the machine where it will be formed in a cock or shock by the teeth 4 depending from the parts 3ᵇ, and may be dumped from time to time by operation of the lever 8 by the operator.

The invention also provides means by which shocks that have been formed during the cutting of a former swath may be deflected or pushed aside to prevent the wheel E interfering therewith, said means consisting of spaced arms 14 and 15 having angular ends 16 and 17 respectively secured to the draft tongue B, said arms 14 and 15 being connected by bolts 18 and spaced by spacing sleeves 19. Arm 14 has depending angular teeth 20, and 21 indicates a caster roller connected to the outer free end of the arm 15. It will be apparent that the arms 14 and 15, and the teeth 20 will serve to deflect or push aside shocks or cocks of hay in advance of the traction wheel E.

It will be furthermore understood that by omitting teeth 4 adjacent to the wheel D that the cut material may be left in a windrow behind the mowing machine when the user of the implement prefers to cure his cut hay in windrows rather than in cocks or shocks.

It will also be understood that any suitable means may be utilized for holding the rake frame 3 elevated when transporting the implement from and to the field, such for instance as a chain or other flexible member secured to the frame at one end and having its other end secured to any convenient part of the mowing machine, such a structure being obvious and not considered necessary to be illustrated.

What is claimed is:—

1. A shocker attachment for mowing machines, comprising an inverted U-shaped supporting member adapted to be secured to the axle of a mowing machine and straddle a driving wheel thereof, a supporting member adapted to be secured to the mowing machine platform, a shaft journaled on said members and having an extension located in the rear of the cutter bar thereof, a rake mounted on said extension, and the shaft provided with means to actuate the rake to dump the contents thereof.

2. A shocker attachment for mowing machines, comprising an inverted U-shaped supporting member adapted to be secured to the axle of a mowing machine and straddle a driving wheel thereof, a supporting member adapted to be secured to the mowing machine platform, a shaft journaled on said members and having an extension located in the rear of the cutter bar thereof, said shaft being forwardly inclined relatively to the cutter bar, a rake mounted on the extension, and means to rotate the shaft and actuate the rake to dump it.

3. A shocker attachment for mowing machines, comprising an inverted U-shaped supporting member adapted to be secured to the axle of a mowing machine and straddle a driving wheel thereof, a supporting member adapted to be secured to the mowing machine platform, a shaft journaled on said members and having an extension located in the rear of the cutter bar thereof, a rake mounted on said extension, a crank on said shaft, and a lever suitably fulcrumed and pivotally engaging the crank to actuate the shaft and move the rake into dumping position.

4. A shocker attachment for mowing machines, comprising an inverted U-shaped supporting member adapted to be secured to the axle of a mowing machine and straddle a driving wheel thereof, a supporting member adapted to be secured to the mowing machine platform, a shaft journaled on said members and having an extension located in the rear of the cutter bar thereof, a rake pivotally engaging said extension, an arm on the extension engaging the rake, and means to rotate the shaft and arm to raise the rake and dump its contents.

5. A shocker attachment for mowing machines, comprising a shaft adapted to be journaled on a mowing machine and having an extension located in the rear of the cutter bar thereof, a rake head mounted on the extension and having rake teeth secured thereto, said rake head consisting of a bar curved rearwardly relatively to the mowing machine cutter bar and having its ends engaging the extension, said bar having the portion adjacent the outer end curved on a greater radius than the portion adjacent the inner end thereof to direct the raked material to the inner portion of a swath cut by the cutter bar.

6. In combination with a mowing machine, traction wheels therefor, and a draft tongue, a shock deflector comprising a bar secured to the draft tongue and having a rearwardly deflected portion, and teeth secured to said rearwardly deflected portion.

In testimony whereof I affix my signature.

HENRY B. HALE.